United States Patent [19]

Reese et al.

[11] Patent Number: 4,550,677
[45] Date of Patent: Nov. 5, 1985

[54] SIFTER FOR BREADING APPARATUS

[75] Inventors: Vernon E. Reese, Tulsa, Okla.; Roger A. Schwierking, Tipp City, Ohio

[73] Assignee: Henny Penny Corporation, Eaton, Ohio

[21] Appl. No.: 653,721

[22] Filed: Sep. 21, 1984

[51] Int. Cl.4 ............... B05C 19/00; B05C 11/10
[52] U.S. Cl. ........................... 118/31; 118/610; 209/302; 209/234; 209/634
[58] Field of Search ............... 118/26, 31, 29, 603, 118/610; 209/301, 302, 234, 255, 634, 695

[56] References Cited
U.S. PATENT DOCUMENTS 3,910,227 10/1975 Reece .................................. 118/29
4,182,260 1/1980 Reece .................................. 118/26

Primary Examiner—John P. McIntosh
Attorney, Agent, or Firm—Frost & Jacobs

[57] ABSTRACT

A sifter for removing dough balls from breading, the sifter comprising a basket having foranamous side and bottom walls, the bottom wall being of conical configuration tapering downwardly to a centrally disposed discharge opening surrounded by a pair of spaced apart concentric annular walls projecting upwardly from the bottom wall and closed by a cover, spaced apart openings extending upwardly from the bottom edges of the annular walls of a size to pass dough balls therethrough, the openings in one of the annular walls being offset circumferentially with respect to the openings in the other annular wall, the annular walls serving as barriers to the passage of breading toward the discharge opening but permitting dough balls to pass inwardly for discharge as the basket is oscillated.

15 Claims, 8 Drawing Figures

SIFTER FOR BREADING APPARATUS

This invention relates to breading apparatus of the type wherein the food to be breaded, such as pieces of chicken, are first dipped in a batter and then placed in a container of flour wherein the pieces are manually manipulated so as to completely cover them with flour prior to cooking. More specifically, the present invention relates to an improved sifting mechanism which automatically removes dough balls which are formed in the flour container as an incident of the breading operating.

BACKGROUND OF THE INVENTION

In hand breading apparatus of the type taught in U.S. Pat, No. 3,910,227 and 4,182,260, the apparatus comprises a table structure mounting and open top breading pan having a central opening in its bottom which is normally closed by a removable plug. A sifter is mounted beneath the breading pan and a catch pan is positioned beneath the sifter, the sifter being in the form of an upwardly opening foraminous basket adapted to be oscillated about its vertical axis.

In use, the breading, which is usually flour admixed with other flavoring ingredients, is placed in the breading pan, the opening in the bottom of the pan being closed by its plug. The pieces of food to be breaded are first dipped in a container of batter mix positioned adjacent the breading pan and the food pieces are then dipped in the breading where they are manipulated by hand to ensure complete coverage by the breading. As an incident of the breading procedure, some of the batter mix combines with the breading to form dough balls which do not adhere to the pieces of food when they are removed from the breading pan. These dough balls remain in the flour, and as the breading operation continues the flour becomes contaminated with dough balls to the point where the breading operation becomes inefficient and ineffective to completely cover the pieces of food with the breading.

Even though the breading is contaminated with dough balls, it is uneconomical to discard the remaining breading; and in order to salvage reusable breading, the plug in the bottom of the breading pan is removed and the residual breading discharged downwardly into the underlying sifter which is then oscillated to thereby sift reusable breading into the catch pan which underlies the sifter. Reusable breading deposited in the catch pan is returned to the breading pan, whereas the dough balls are retained in the sifter. With this arrangement, it is necessary to remove the sifter to discharge the collected dough balls, or in the alternative, the dough balls must be removed from the sifter by hand. In either event, the removal of the dough balls is a time-consuming operation.

In contrast to the foregoing, the present invention provides an improved sifting mechanism which automatically discharges the dough balls from the sifter as an incident of the sifting operation.

SUMMARY OF THE INVENTION

In accordance with the present invention, an improved sifting mechanism is provided wherein the bottom of the sifting basket is of shallow conical configuration, tapering downwardly toward a centrally disposed opening through which the dough balls are discharged. The central opening in the bottom of the sifter is surrounded by a spaced-apart pair of annular walls extending vertically upwardly within the sifter basket, the annular walls preferably being fixedly secured to the bottom of the sifter. A cover plate overlies the area of the sifter bottom encompassed by the outer annular wall and is detachably secured to one of the annular walls so that it may be removed to facilitate cleaning of the sifter.

The outer annular wall has spaced-apart openings therein extending upwardly from the bottom of the wall, preferably four in number spaced at 90° angles to each other, the openings being of a size to permit the dough balls to freely pass through them.

The inner annular wall is also provided with spaced-apart openings, again preferably four in number and spaced at right angles to each other. In addition, the openings in the inner annular wall are offset circumferentially with respect to the openings in the outer annular wall, a given opening in the inner annular wall preferably lying equidistant between adjacent openings in the outer annular wall.

With the arrangement just described, as the sifter basket is oscillated, the breading will be thrown outwardly toward the periphery of the basket where the bulk of it will be sifted into the underlying catch pan. Such movement may be facilitated by making the cover plate for the annular walls of shallow conical configuration so that the breading will be caused to flow toward the perimeter of the sifter basket. The heavier dough balls will tend to roll inwardly along the downwardly inclined conical bottom of the sifter basket and along the outer annular wall until an opening is reached, whereupon the dough balls will move between the walls and finally through one of the openings in the inner annular wall for discharge. The annular walls effectively prevent breading from reaching the discharge opening for the dough balls.

A suitable container is provided to receive the dough balls discharged from the sifter basket. To this end, a discharge conduit extends between the opening in the bottom of the sifter basket to a catch bucket for the dough balls which may be suspended from a side edge of the catch pan for the breading or from a lower extremity of the breading table.

In a preferred embodiment of the invention, the cover plate is provided with a depending annular flange which surrounds the outer annular wall, the annular flange having spaced apart openings therein corresponding to the openings in the outer annular wall. By rotating the cover plate relating to the outer annular wall, the size of the opening may be varied, or the opening may be completely closed.

DESCRIPTION OF THE PREFERRED EMBODIMENT

Figure 1:
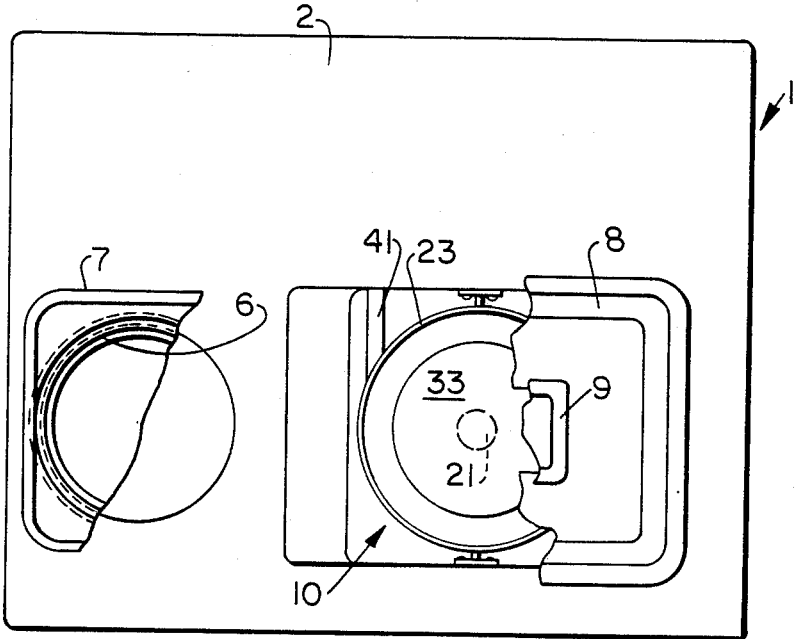
FIG. 1 is a plan view with parts broken away of sifting apparatus in accordance with the invention.
Figure 2:
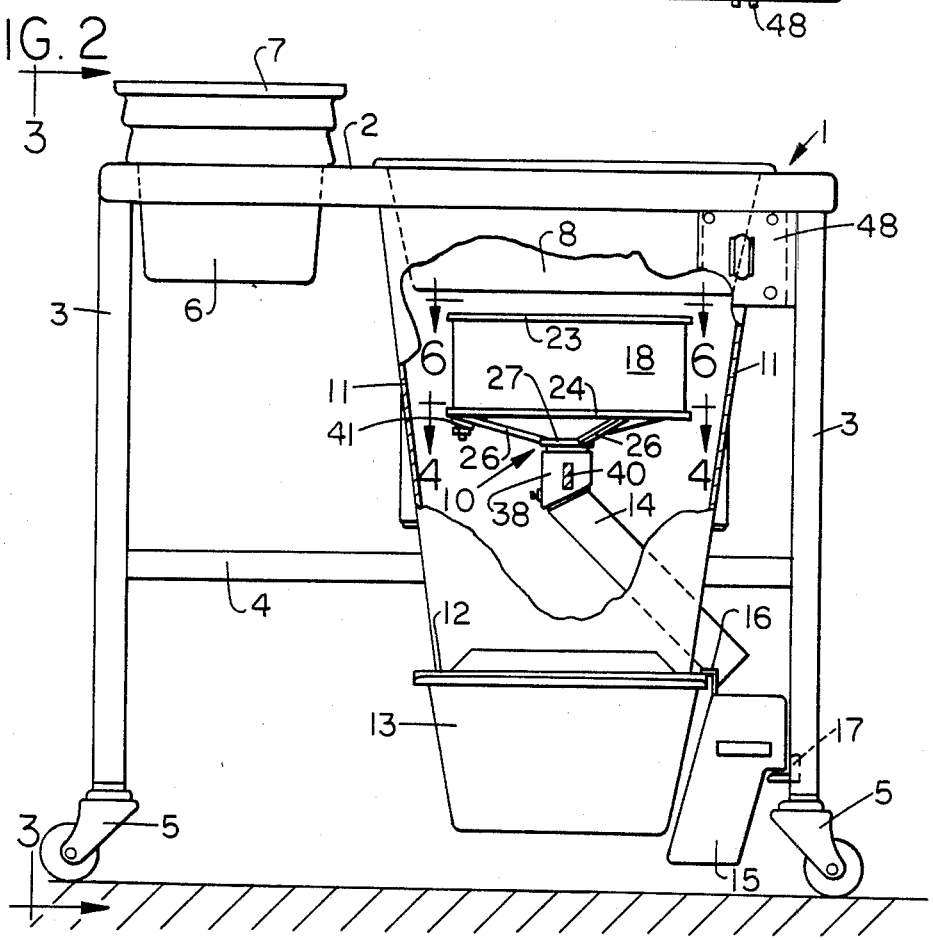
FIG. 2 is a front elevational view of the breading apparatus with parts broken away to show its internal construction.

The breading apparatus comprises a breading table, indicated generally at 1, having a top 2 and depending legs 3, the latter being interconnected intermediate there ends by cross braces 4. The legs 3 will preferably mount rotatable casters 5 at their lowermost ends to permit the breading table to be easily moved from place to place.

The top 2 mounts a removable container 6 for batter mix which is preferably surrounded by a drip tray 7. The top 2 also mounts a breading pan 8 having a centrally disposed opening in its bottom which is normally covered by a removable plug 9, the opening in the bottom of the breading pan 8 overlying the sifter mechanism which is generally indicated at 10. The sifter mechanism 10 is surrounded by enclosing walls 11 which taper downwardly from the undersurface of the top 2, the walls 11 terminating at their lower extremity in a bracket 12 adapted to slidably receive a removable catch pan 13 underlying the sifter mechanism 10. A discharge conduit 14 receives dough balls from the sifter mechanism 10 and deposits them in a catch bucket 15 suspended from a side edge of the catch pan 13 by means of hanger 16, the opposite side of the catch bucket being supported on a flange 17 secured at its opposite ends to adjoining legs 3 of the breading table.

Figure 4:
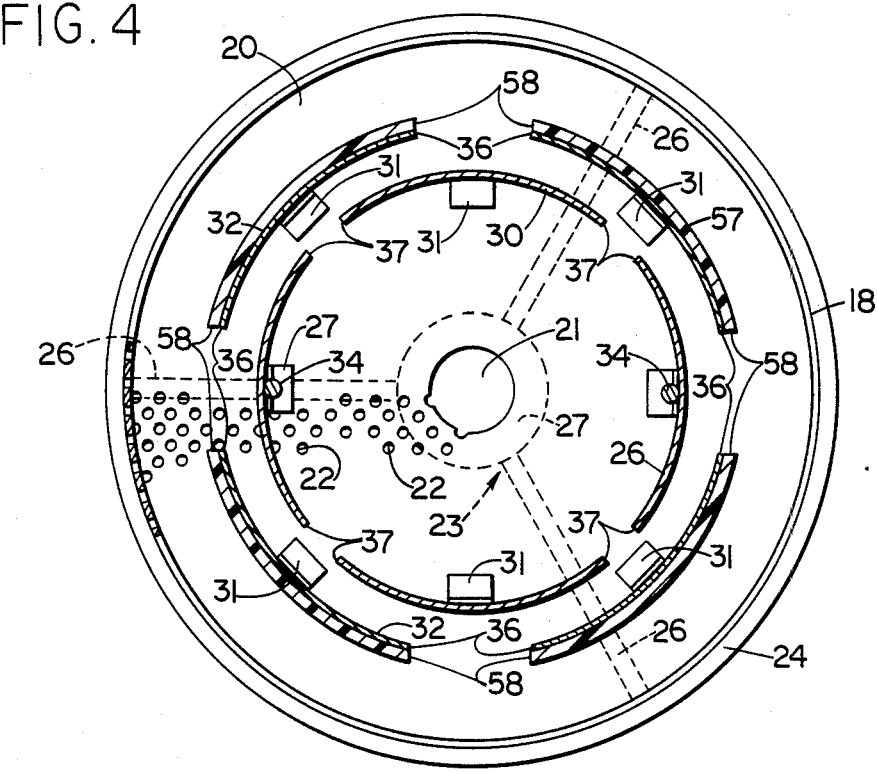
FIG. 4 is an enlarged horizontal sectional view of the sifter taken along line 4—4 of FIG. 2.
Figure 5:
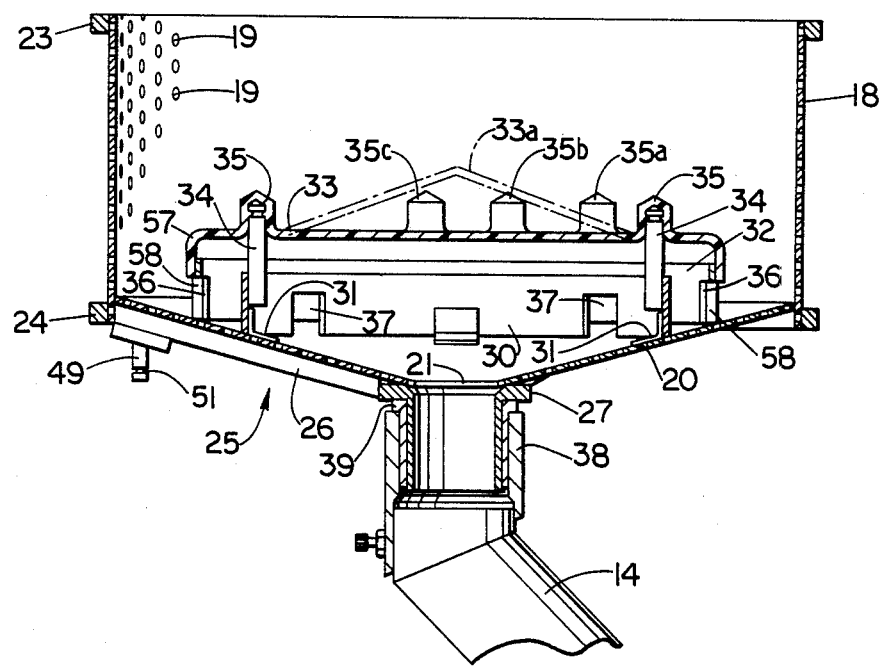
FIG. 5 is a vertical sectional view taken along the line 5—5 of FIG. 4.
Figure 6:
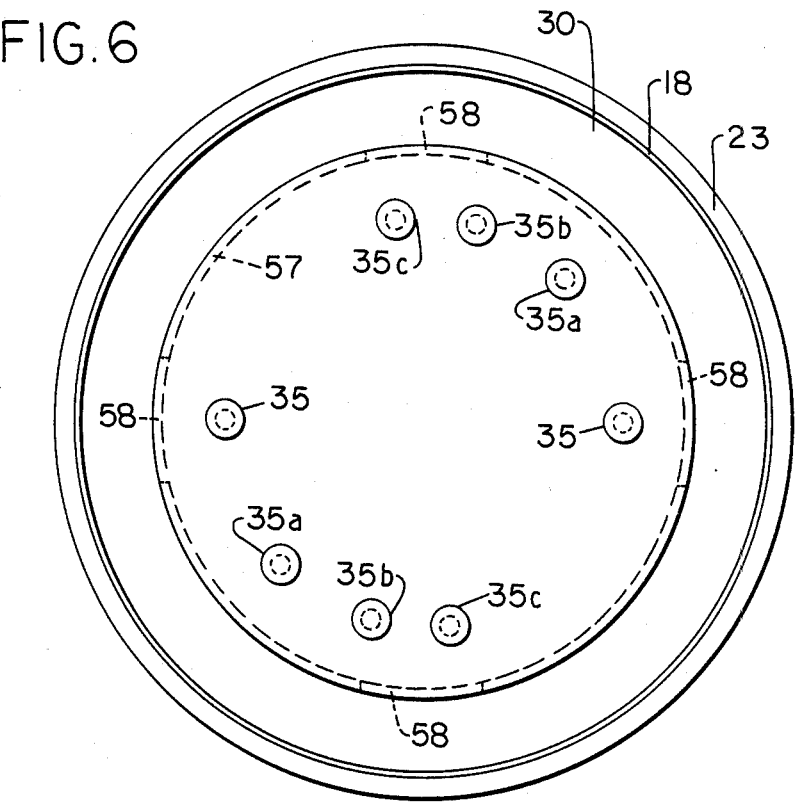
FIG. 6 is an enlarged plan view of the cover plate for the sifter basket taken along the line 6—6 of FIG. 2.

With the foregoing general organization in mind, reference is made to FIGS. 4 and 5 for details of the sifter mechanism 10. The sifter basket comprises a foraminous annular wall 18 having closely spaced perforations 19 therein of a size to permit the breading to sift through the perforations. The bottom of the basket is defined by a conical wall 20 having a discharge opening 21 at its apex, the conical bottom wall having perforations 22 corresponding to the perforations 19. Alternatively, the annular wall 18 and conical bottom wall 20 may be formed from wire mesh. The periphery of the conical bottom wall 20 may be secured directly to the lowermost edge of annular wall 18 and the basket reinforced by annular bands 23 and 24, or the annular wall and conical bottom wall may be integral.

The conical bottom wall of the basket seats on a spider 25 having a plurality of arms 26 projecting radially outwardly from a hub 27. Preferably the arms 26 will be secured to the bottom wall 20 of the basket so that the basket and the spider may be handled as a unit.

In accordance with the invention, the conical bottom wall 20 is provided with an inner annular wall 30 projecting upwardly from the conical bottom wall 20, the inner annular wall 30 being secured to the bottom wall 20 by means of brackets 31 welded to the parts. An outer annular wall 32 surrounds the inner annular wall and lies in spaced relation thereto, the annular walls being concentric with respect to each other and with the discharge opening 21. The outer annular wall 32 is also preferably secured to the bottom wall by means of brackets 31 welded to the parts.

A cover plate 33 overlies the annular walls and closes the area of the bottom wall 20 lying within the confines of the outer wall 32. Preferably, the cover plate 33 is secured to the inner wall 30 by means of locking pins 34 welded to opposite sides of the inner annular wall 30, the pins 34 projecting upwardly for snap-lock engagement with opposing pairs of snap fasteners 35 on cover plate 33, thereby permitting the cover plate to be easily removed for cleaning purposes. Preferably the cover-plate 33 will be formed from plastic with the snap fasteners 35 integrally molded in the cover plate. The cover plate 33 may be planar or, if desired, may be of conical configuration, as indicated by broken lines at 33a in FIG. 5.

The outer annular wall 32 is provided with a plurality of spaced apart openings 36 extending upwardly from its bottom edge, preferably four in number spaced at 90° angles to each other, the openings being of a size to permit the dough balls to pass freely therethrough.

The inner annular wall 30 is also provided with a plurality of spaced apart openings 37, again preferably four in number and spaced at right angles to each other. The openings 37 in the inner annular wall are offset circumferentially with respect to the openings 36 in the outer annular wall, with a given opening 37 in the inner annular wall preferably lying equidistant between adjacent openings 36 in the outer annular wall.

Figure 3:
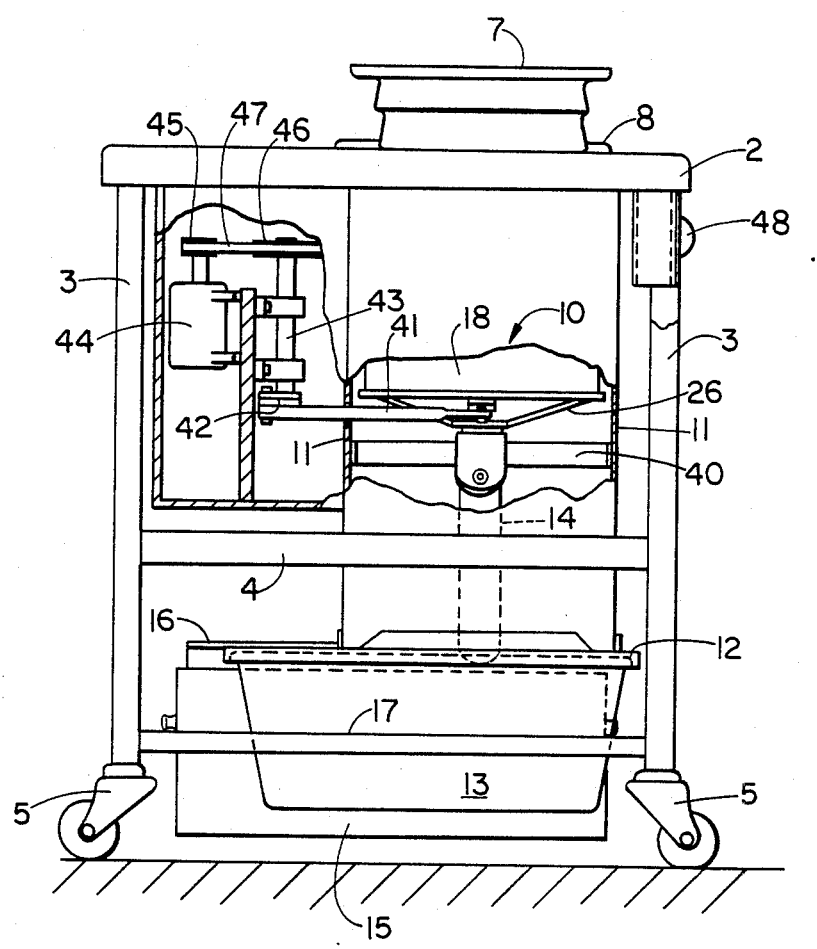
FIG. 3 is a side elevational view of the breading apparatus taken along the line 3—3 of FIG. 2 with parts broken away to show its internal construction.

In the operation of the device, the hub 27 of the spider 25 is rotatably mounted in a collar 38 having a bearing 39, the collar being affixed to the enclosing walls 11 of the breading table 1 by brackets 40, as seen in FIG. 3. With this arrangement, the spider 25 and the sifter basket are mounted for rotation relative to the collar 38 and brackets 40 and may be removed by lifting the basket to remove hub 27 from the collar 38.

The sifter is adapted to be oscillated by means of a crank arm 41 connected at one end to the outer extremity to one of the radial arms 26 of spider 25, the opposite end of the crank arm being connected to a second crank arm 42 connected to drive shaft 43 driven by motor 44 through sheaves 45 and 46 and drive belt 47. The drive mechanism is conventional and the motor 44 is adapted to be energized by means of switch 48 mounted on the front of the breading table.

Figure 7:
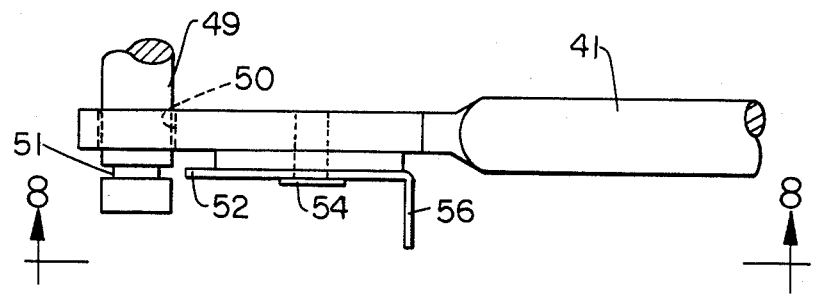
FIG. 7 is an enlarged fragmentary side elevational view of a latch for detachably connecting a crank arm to the sifter.
Figure 8:
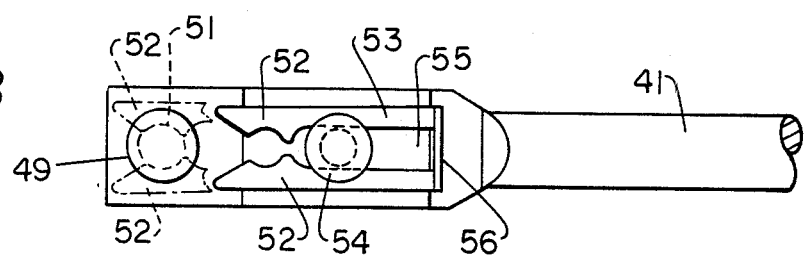
FIG. 8 is a sectional view taken along the line 8—8 of FIG. 7.

Since it is preferred to form the sifter basket and supporting spider as an integral unit which can be removed for cleaning, a quick disconnect is provided to disengage the crank arm 41 from the spider 25. As seen in FIGS. 5 and 7, a short cylindrical post 49 is secured to one of the radial arms 26, the post having a diameter of a size to be received in an opening 50 in the outer end of crank arm 41. The post is provided with an annular recess or groove 51 intermediate its opposite ends which is adapted to be engaged by the spring fingers 52 of latch arm 53 mounted on the underside of the crank arm by means of headed stud 54, the latch arm having a slot 55 in which the headed stud 54 is received. The latch arm is displaceable axially by means of finger grip 56 from a retracted position in which the spring fingers 52 are free from engagement with the post 49 to an extended position in which the spring fingers 52 engage in the groove 51 in the post 49, as shown in dotted line, thereby rotatably securing the outer end of the crank arm to the post 49. When the latch arm 52 is retracted, the post and crank arm may be disengaged and the basket removed by lifting it upwardly to disengage post 49 from opening 50 in crank arm 41.

When dough ball containing breading is discharged from the breading pan 8 into the underlying sifter, the drive mechanism is actuated to oscillate the sifter, the usable breading being shaken outwardly and downwardly through the sifter basket for collection in the underlying catch pan 13. As the sifter basket oscillates, the dough balls will move inwardly along the conical bottom 20 of the sifter and ultimately will pass inwardly through one of the openings 36 in the outer annular wall 32, the dough balls then traveling laterally between the inner and outer annular walls until one of the openings 37 in the inner wall is reached, the dough balls passing through the openings in the inner wall for discharge through discharge opening 21 and discharge conduit 14, the conduit dispositing the dough balls in the catch bucket 15. The annular walls 30 and 32 act as barriers to the passage of breading toward the discharge opening 21, any breading collecting against the annular walls being sifted through the perforations 22 in the bottom wall 20 as the sifter basket oscillates. Such arrangement eliminates the necessity for periodic removal of dough balls from the sifter basket as heretofore required. At the same time, the shifter mechanism may be readily removed for normal cleaning.

In a preferred embodiment of the invention, the cover plate 33 is provided with a downwardly directed annular flange 47 which closely surrounds the outer annular wall 32, the annular flange having opening 58 therein corresponding to the opening 36 in the outer annular wall 32. With this arrangement, the user may selectively control the size of the opening in the outer annular wall 32 by rotating the cover plate 33 so as to cause the openings 58 in the annular flange to partially overlap the openings 36 in the outer annular wall or close them completely. Where the breading practices of a given user result in relatively few dough balls for a given amount of breading mix, it is desirable to restrict the size of the openings in the outer annular wall to minimize the guantity of breading mix which works its way toward the discharge opening 21.

It has also been found that some users prefer to initially mix their breading ingredients in the sifter basket, in which event the openings 36 in outer annular wall may be completely closed during the mixing operation. In an exemplary embodiment of the invention wherein the outer annular wall 32 has a diameter of about 8½ inches, the openings in the outer annular wall and in the annular flange will each have a length of approximately 2 inches, whereas the openings 37 in the inner annular wall 30 will each have a length of approximately 1 inch.

To facilitate rotational adjustment of the cover plate 33 and depending flange 57, the cover plate may be provided with additional sets of snap fasteners 35a, 35b, and 35c which may be selectively engaged with the locking pins 34 to establish different rotational positions of flange 58 and hence different size openings in outer annular wall 32 ranging from fully open (set 35) to fully closed (set 35a), sets 35b and 35c acting to position the cover and flange to partially close the openings 36.

Modifications may be made in the invention without departing from its spirit and purpose. For example, different forms of detachable locking means may be utilized to secure the cover plate to the annular walls, and the annular flange 50 may be formed as a separate member or as slide gates displaceable relative to the openings in the outer annular wall.

What is claimed is:

1. A sifter for separating reusable breading from dough balls formed as an incident of a breading operation, said sifter comprising a foraminous cylindrical basket having a downwardly tapered conical bottom, an opening at center of said conical bottom, a pair of spaced-apart concentric annular walls surrounding said opening and projecting upwardly from the conical bottom of said basket, a plurality of spaced-apart openings in each of said annular wall extending upwardly from the bottom edges of said walls, the openings in one of said annular walls being offset circumferentially with respect to the openings in the other of said annular walls, and a cover at the upper ends of said annular walls enclosing the area of the bottom of the basket lying within the confines of the outermost annular wall.

2. The sifter claimed in claim 1, wherein said cover is planar.

3. The sifter claimed in claim 1, wherein said cover is conical, having its apex uppermost.

4. The sifter claimed in claim 1 including attachment means detachably securing said cover to one of said annular walls.

5. The sifter claimed in claim 4, wherein said attachment means comprise snap fasteners on said cover engagable with coacting locking pins secured to one of said annular walls.

6. The sifter claimed in claim 1 including displaceable means associated with said outer annular wall to vary the size of the openings in said outer annular wall.

7. The sifter claimed in claim 6 wherein said displaceable means comprises an annular member surrounding said outer annular wall, said annular member having openings therein corresponding to the openings in said outer annular wall, said annular member being rotatable relative to said outer annular wall to selectively open and close the openings in said outer annular wall.

8. The sifter claimed in claim 7 wherein said annular member is integrally formed with said cover.

9. The sifter claimed in claim 8 including attachment means detachably securing said cover to one of said annular walls in a plurality of positions.

10. The sifter claimed in claim 1, including a support mounting a rotatable holder on which said basket is seated, said holder having an opening therein in alignment with the opening in the bottom of the basket, and a discharge conduit operatively connected to the opening in said holder.

11. The sifter construction claimed in claim 10, wherein said holder is rotatable relative to said discharge conduit.

12. The sifter construction claimed in claim 11 including a doughball catch pan for receiving dough balls from said discharge conduit.

13. The sifter construction claimed in claim 12 including means for oscillating said rotatable holder.

14. The sifter construction claimed in claim 13 wherein said means for oscillating said rotatable holder includes a crank arm, and quick disconnect means detachably connecting said crank arm to said rotatable holder.

15. The sifter construction claimed in claim 14 wherein said quick disconnect means comprises a latch arm mounted on said crank arm movable from a retracted to an extended position, spring fingers on said latch arm positioned to engage a grooved post attached to said rotatable holder when said latch arm is in the extended position.

* * * * *